US011981040B2

(12) United States Patent
Didden

(10) Patent No.: US 11,981,040 B2
(45) Date of Patent: May 14, 2024

(54) DOUBLE-SIDED RAZOR

(71) Applicant: Hendrikus Didden, Port St. Lucie, FL (US)

(72) Inventor: Hendrikus Didden, Port St. Lucie, FL (US)

( * ) Notice: Subject to any disclaimer, the term of this patent is extended or adjusted under 35 U.S.C. 154(b) by 0 days.

(21) Appl. No.: 18/184,777

(22) Filed: Mar. 16, 2023

(65) Prior Publication Data

US 2023/0294315 A1 Sep. 21, 2023

Related U.S. Application Data

(60) Provisional application No. 63/269,403, filed on Mar. 16, 2022.

(51) Int. Cl.
*B26B 21/22* (2006.01)
*B26B 21/40* (2006.01)
*B26B 21/52* (2006.01)

(52) U.S. Cl.
CPC ........ *B26B 21/222* (2013.01); *B26B 21/4018* (2013.01); *B26B 21/521* (2013.01); *B26B 21/522* (2013.01)

(58) Field of Classification Search
CPC . B26B 21/222; B26B 21/4018; B26B 21/521; B26B 21/522; B26B 29/00; B26B 21/40; B26B 21/4043; B26B 21/523
See application file for complete search history.

(56) References Cited

U.S. PATENT DOCUMENTS 1,810,593 A * 6/1931 Brown .................... B26B 29/00 30/308.2
2,122,263 A * 6/1938 Pinter ..................... B26B 29/00 30/169
4,461,078 A * 7/1984 Carreker ............ B26B 21/4043 30/526
4,989,328 A * 2/1991 Sokoloff ............... B26B 21/523 30/40.2
5,551,153 A * 9/1996 Simms .................... B26B 21/56 30/41
6,052,905 A * 4/2000 Branchinelli ......... B26B 21/222 30/526
6,125,857 A * 10/2000 Silber ..................... B26B 21/00 132/289
6,385,850 B1 * 5/2002 Coulthard, Jr. ..... B26B 21/4062 30/41.5
6,434,828 B1 * 8/2002 Andrews ................. B26B 21/56 30/529

(Continued)

*Primary Examiner* — Jonathan G Riley

(57) ABSTRACT

A double-sided razor is configured with connection mechanisms on opposite sides to engage with attachable and replaceable razor blades. In typical implementations, the razor may have a short side and a long side that respectively engage with relatively shorter and longer-sized razor blades. Users can use different-sized razor blades for different shaving scenarios. For example, the longer-sized razor blade may be used to shave the face, legs, chest, etc., whereas the short-side razor blade may be used to shave the user's upper lip, pubic and genital region, etc. The short-side razor blade may help the user shave more precisely and cautiously to prevent an unnecessary cut. A bottom side of the double-sided razor can have a lever that rotatably pivots from one side of the razor to the other so a guard can block the unused blades from cutting a user.

8 Claims, 4 Drawing Sheets

(56) References Cited

U.S. PATENT DOCUMENTS

| | | | | |
|---|---|---|---|---|
| 6,476,984 | B1 * | 11/2002 | Ringdahl | B26B 21/40 359/809 |
| 6,560,876 | B2 * | 5/2003 | Carr | B26B 21/06 30/50 |
| 6,581,290 | B1 * | 6/2003 | Fishel | B26B 21/40 30/526 |
| 8,015,711 | B2 * | 9/2011 | Psimadas | B26B 21/52 30/526 |
| 2006/0070239 | A1 * | 4/2006 | Ries | B26B 21/522 30/34.2 |
| 2009/0211099 | A1 * | 8/2009 | Louis | B26B 21/446 30/41 |
| 2013/0199346 | A1 * | 8/2013 | Psimadas | B26B 21/225 83/13 |
| 2016/0193740 | A1 * | 7/2016 | Phillips | B26B 21/521 30/34.05 |
| 2016/0288350 | A1 * | 10/2016 | Contaldi | B26B 21/222 |
| 2017/0197322 | A1 * | 7/2017 | Drori | B26B 21/42 |
| 2022/0072725 | A1 * | 3/2022 | Drori | B26B 21/4037 |

* cited by examiner

DOUBLE-SIDED RAZOR

BACKGROUND

Shaving razors are typically limited in their usability by the single-size blade they come with. Users who wish to shave in harder-to-reach places or the nooks and crannies of their body (e.g., beneath the nose, ankles, pubic area, etc.) either find using the same razor to be a challenge or are forced to get a new razor that better accommodates their need. Such limitations of typical razors cause frustration and inconvenience for users.

SUMMARY

A double-sided razor is configured with connection mechanisms on opposite sides to engage with attachable and replaceable razor blades. In typical implementations, the razor may have a short side and a long side that respectively engage with relatively shorter and longer-sized razor blades. Users can use different-sized razor blades for different shaving scenarios. For example, the longer-sized razor blade may be used to shave the face, legs, chest, etc., whereas the short-side razor blade may be used to shave the user's upper lip, pubic and genital region, etc. The short-side razor blade may help the user shave more precisely and cautiously to prevent an unnecessary cut.

The double-sided razor may be equipped with fastening mechanisms such as tab and notch, press-fit, etc. Each side of the double-sided razor may have a release button that causes the razors to individually release responsive to user pressure at the release buttons.

A bottom side of the double-sided razor can have a lever that rotatably pivots from one side of the razor to the other. The lever pivots about a pivot bar extending from one length side to the other. An arm extends outward from the razor's body and ends at a guard which can rest on the blades exposed on the underside of the razor. The guard prevents the unused blade from inadvertently knicking a user while using the other blade. The lever and razor's body are adapted with a press-fit mechanism so that the lever stays in place while in use. While a press-fit mechanism is described herein, other forms of locking the lever in place are also possible, such as a male connector into a female receptacle, among other connection mechanisms.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from reading the following Detailed Description and reviewing the associated drawings.

BRIEF DESCRIPTION OF THE DRAWINGS

Like reference numerals indicate like elements in the drawings. Elements are not drawn to scale unless otherwise indicated.

DETAILED DESCRIPTION

Figure 1:
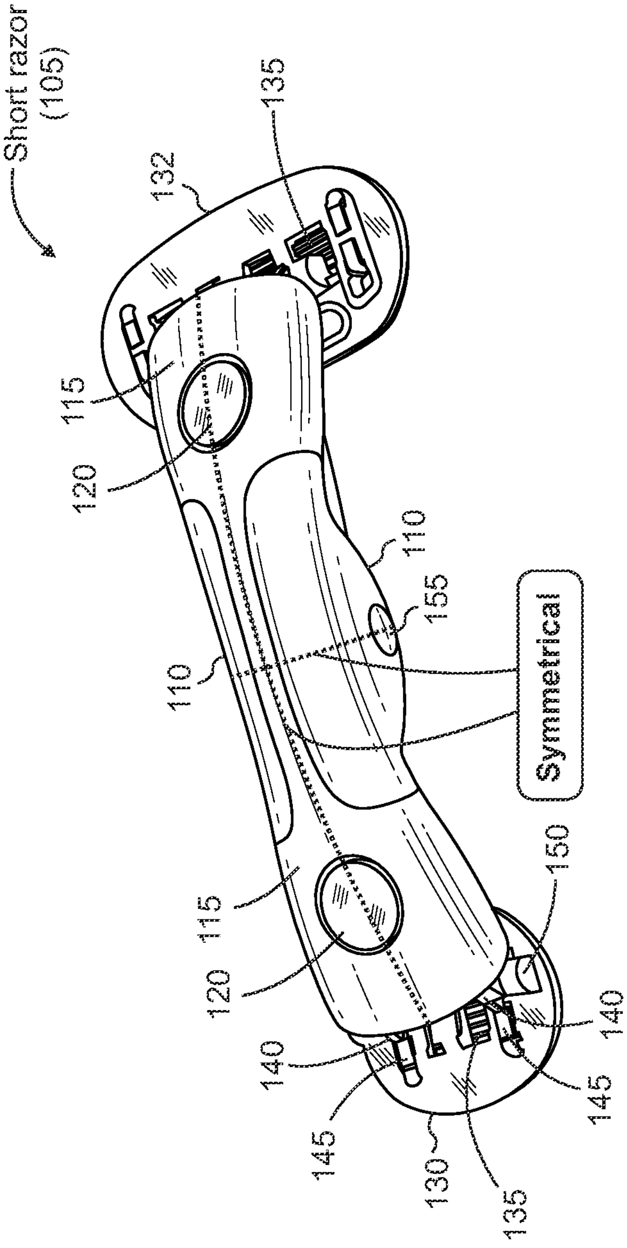
FIG. 1 shows illustrative representations of a short double-sided razor with different-sized blades on opposing ends.

FIG. 1 shows illustrative representations of a double-sided razor 105 (hereinafter referred to as "razor" or "double-sided razor") that have two distinct razor blades on opposing ends thereof. Any discussion of the "razor" or "double-sided razor" is focused on the razor's body, excluding the attachable blades. For example, on one end of the razor is a longer blade 132, which may be shaped and sized like a more conventional razor. On the opposite end of the razor is a smaller blade 130 that provides the user with more precise shaving to accommodate different shaving scenarios. The smaller and larger blades each have a set of blades 135 exposed on an underside thereof that are used for shaving a user's hair.

Each blade 130, 132 are configured with similar connection mechanisms that engage with corresponding connection mechanisms on the ends of the razor itself. For example, each end of the blade may have male connectors 140 that engage with female receptacles 145 and cause the blades to securely lock in place. Blocks 150 help secure the connectors 140 in a static position while locked to the receptacles. Release buttons 120 cause the male connectors 140 to pivot and thereby disengage from the receptacles 145. Each release button independently releases the short blade 130 or long blade 132. Connection mechanisms between the blades and the razor are described in U.S. Pat. No. 8,033,023, filed Oct. 20, 2004, entitled "Shaving Razors and Cartridges," at Column 2, Line 64 to Column 3, Line 36, the entire contents of which is hereby incorporated herein by reference.

The razor 105 includes two forms of grip material, a rubber or silicone grip portion 110 that provides greater friction between the user and the razor, and thereby heightened grip potential, and another grip material 115 that may be smoother material, such as plastic, metal, etc. to provide greater strength and durability to the razor. Since the razor is double-sided, its body's entire construction is symmetrical width- and length-wise, with the exception of the attached blades. However, as the connection mechanisms are similar on each side of the razor, a user is free to attach same-sized blades to the razor to make the entire device—with blades—symmetrical. The razor's symmetrical nature is with respect to its size, shape, arrangement of components (e.g., grip 110 and 115), release buttons 120, pivot points 155, connectors 140, and any other portion of the razor and its body. The razor includes a pivot point 155, which holds a lever in place to shield the unused blade from inadvertently cutting a user, as discussed in greater detail below. Although not shown, the circular pivot point 155 is on both sides of the razor.

Figure 2:
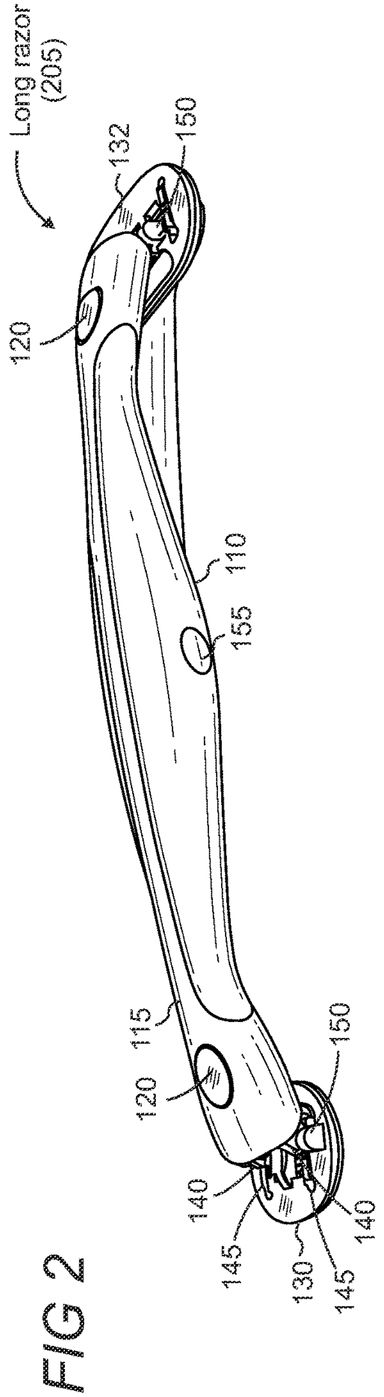
FIGS. 2 and 3 show illustrative representations of long double-sided razors with different-sized blades on opposing ends.
Figure 3:
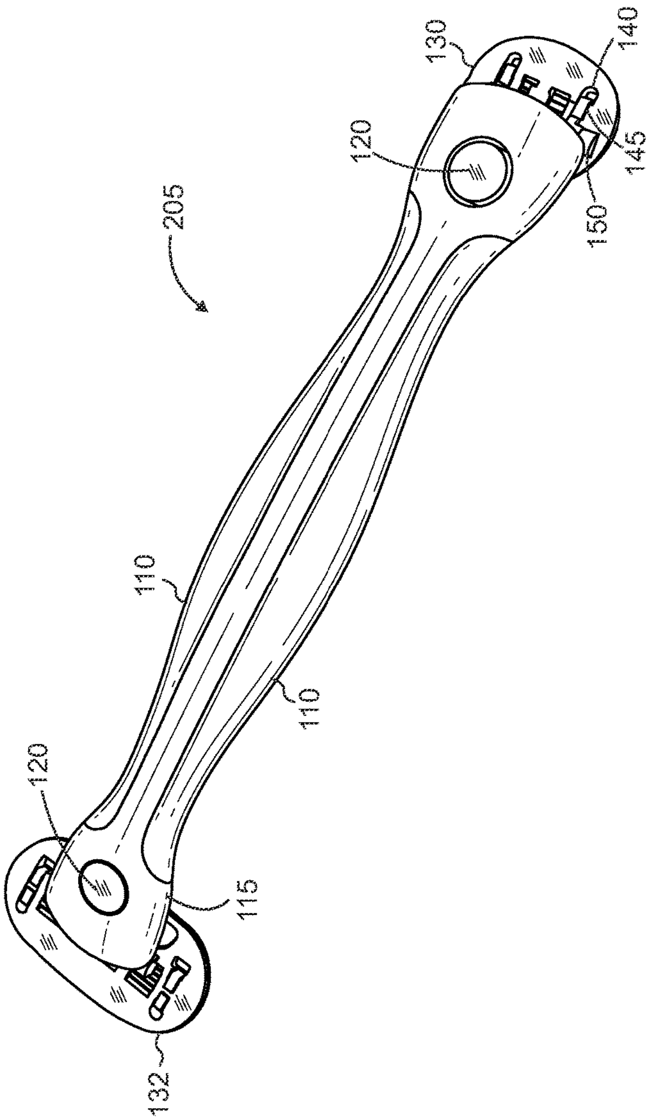

FIGS. 2 and 3 show illustrative representations of a long razor 205, which is constructed similarly to the short razor 105, with the exception that the long razor has a longer body to accommodate different user preferences. Although different reference numerals are used for the short and long razors 105, 205, the razors are otherwise constructed identically, and the remainder of the reference numerals are re-used for clarity in exposition. For example, the longer razor is configured with male connectors 140, female receptacles 145, short blade 130 and long blade 132, pivot point 155, release buttons 120, rubber or silicone grip 110 and plastic or metal grip 115. Thus, any discussion with respect to the short or long razor applies similarly to its counterpart razor. The long razor is adapted with a more defined body relative to the shorter body but maintains a symmetrical design width- and length-wise.

Figure 4:
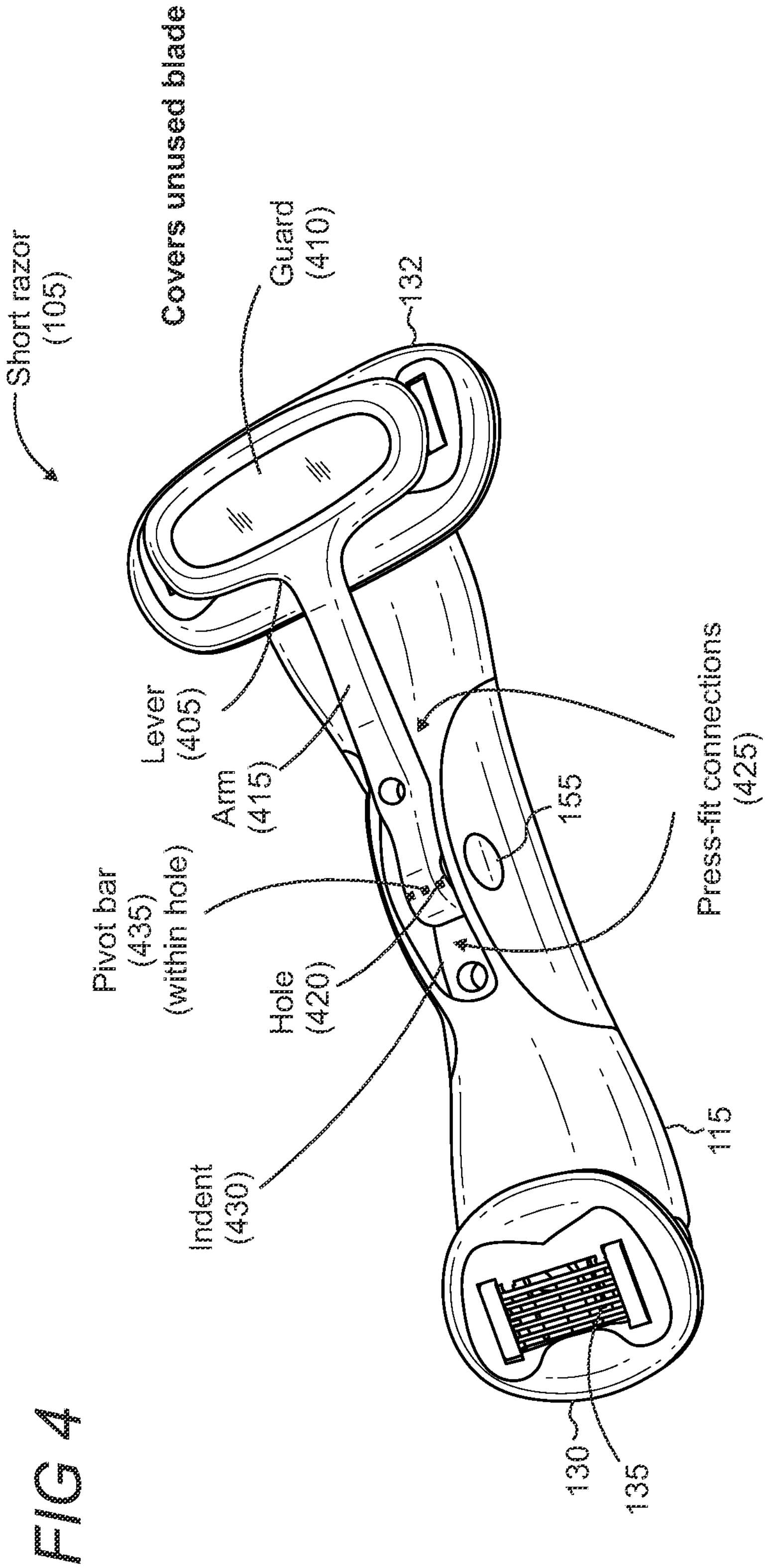
FIG. 4 shows an illustrative representation of the underside of the double-sided razor.

FIG. 4 shows an illustrative representation of the short razor's bottom side. The razor's body includes an indent 430 inside which a lever 405 is secured. The lever includes a hole 420 inside which a pivot bar 435 extends from opposing width-sides of the razor, exteriorly viewable by pivot points 155 positioned on each width-side of the razor. The lever's arm 415 extends from the razor outward to a guard 410. The guard's positioning aligns with the longer blade 132, and, when pivoted to the other side, the shorter blade 130. Specifically, the guard covers the exposed blades 135 on the underside of the razor 105 to prevent the user from inadvertently cutting themselves with the unused blade.

A bottom portion of the lever's arm 415 may have a slightly bigger width than each opposing side of the indent 430 to provide a press-fit connection 425 and thereby secure the lever in place. While a press-fit mechanism is shown, alternative locking/connection mechanisms may include a lever connector that engages with a corresponding receptacle on the bottom of the razor. The connector-receptacle button may be placed at any point where the lever touches the razor's body.

Figure 5:
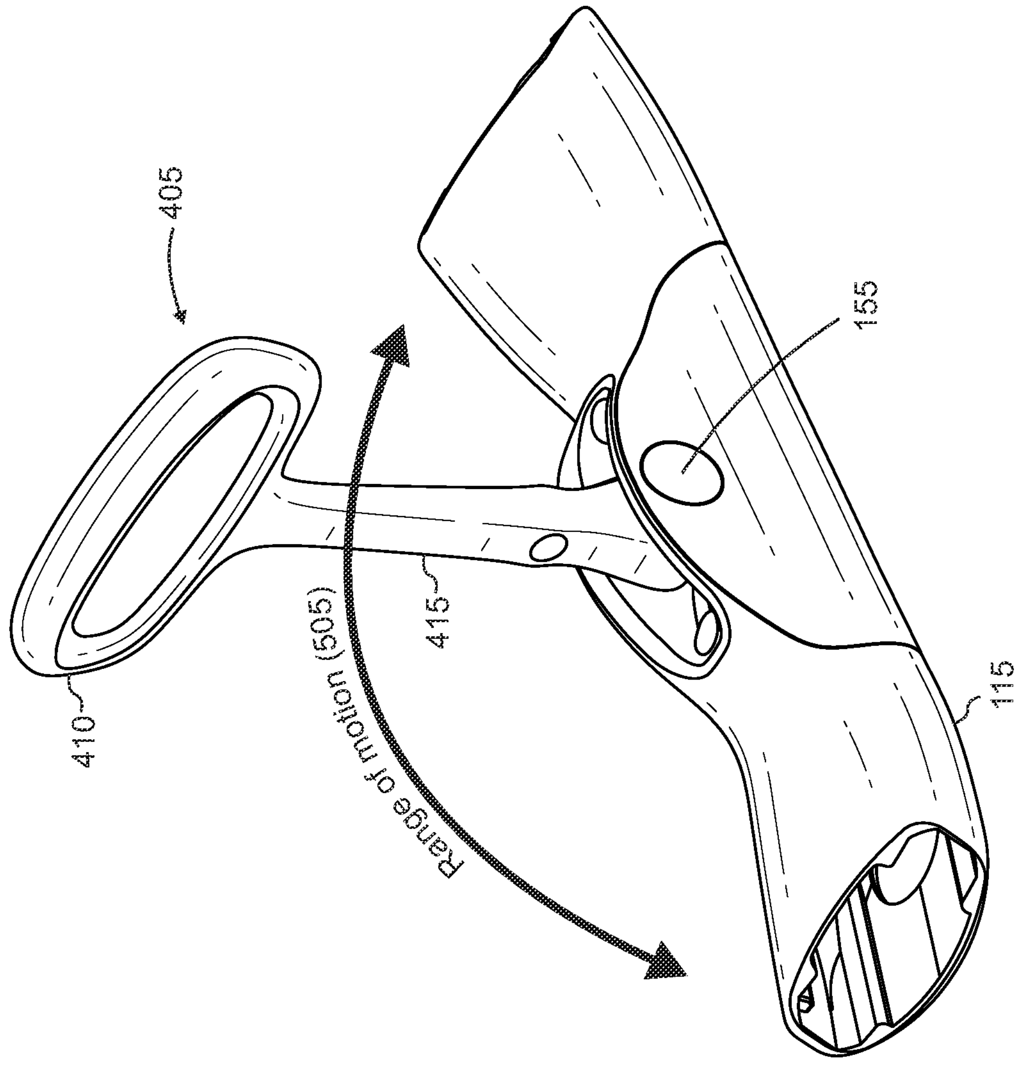
FIG. 5 shows an illustrative representation of a lever's range of motion from opposing sides of the double-sided razor.

FIG. 5 shows an illustrative representation in which the lever 405 is shown rotating about the pivot point 155. A full range of motion 505 is shown by which the lever continues rotating until the guard 410 engages with the shorter blade 130 or longer blade 132 (not shown in FIG. 5). When the lever fully rotates to the opposite side, the lever is temporarily locked in place via the press-fit connection 425 (FIG. 4).

Various exemplary embodiments are disclosed herein. In one exemplary embodiment, there is a double-sided razor, comprising: a body that is substantially symmetrical; a first blade on a first end of the body; and a second blade on a second end of the body, the second end being opposite the first end, wherein the first blade is relatively larger in size than the second blade.

As another example, the body is symmetrical length-wise. In another example, the body is further symmetrical width-wise. As another example, the body is further symmetrical with respect to release buttons positioned on opposing length-sides of the body, in which each release button independently controls the release of the first blade or the second blade. In another example, the body is further symmetrical with respect to its rubber or silicone grip, which extends from the opposing length sides of the body. As a further example, a lever positioned on a bottom side of the body, wherein the lever rotatably pivots about a pivot point that enables the lever to extend from the first blade to the second blade. In another example, the lever press-fits against an indent on the bottom side of the body. As another example, the lever includes an arm that extends from the bottom side of the body outwardly to a guard, in which the guard's position, when engaged with the body, aligns with the first or second exposed blades. In a further example, a pivot bar extending from opposing width sides of the body, in which the pivot bar extends through a hole on the lever and about which the lever rotatably pivots.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A double-sided razor, comprising:

a body that is symmetrical;

a first blade on a first end of the body;

a second blade on a second end of the body, the second end being opposite the first end, wherein the first blade is larger in size than the second blade; and a lever positioned on a bottom side of the body, wherein the lever rotatably pivots about a pivot point that enables the lever to extend from the first blade to the second blade, wherein the lever press-fits against, on opposing sides of its pivot point, indents on the bottom side of the body depending on which side the lever is on.

2. The double-sided razor of claim 1, wherein the body is symmetrical length-wise.

3. The double-sided razor of claim 2, wherein the body is further symmetrical width-wise.

4. The double-sided razor of claim 3, wherein the body further includes release buttons positioned on opposing length-sides of the body, the release buttons being positioned on a top side of the razor and on a substantially same plane as the razor's body, the release buttons also being symmetrical to each other on the body, and in which each release button independently controls the release of the first blade or the second blade.

5. The double-sided razor of claim 4, wherein the body further includes a rubber or silicone grip that extends from the opposing length sides of the body, the rubber or silicone grip being symmetrical on the body.

6. The double-sided razor of claim 1, wherein the lever includes an arm that extends from the bottom side of the body outwardly to a guard, in which the guard's position, when engaged with the body, aligns with the first or second exposed blades.

7. The double-sided razor of claim 6, further comprising a pivot bar extending from opposing width sides of the body, in which the pivot bar extends through a hole on the lever and about which the lever rotatably pivots.

8. A double-sided razor, comprising:

a body that is symmetrical;

a first blade on a first end of the body;

a second blade on a second end of the body, the second end being opposite the first end, wherein the first blade is larger in size than the second blade; and a lever positioned on a bottom side of the body, wherein the lever rotatably pivots about a pivot point that enables the lever to extend from the first blade to the second blade, wherein the lever engages with the first blade when the lever is press-fit on a side of the first end of the body, and the lever engages with the second blade when the lever is press-fit on a side of the second end of the body, and wherein the press-fit on the first and second sides of the body are off-centered.

* * * * *